United States Patent
Prozzi et al.

(10) Patent No.: US 10,612,994 B2
(45) Date of Patent: Apr. 7, 2020

(54) MEASURING PAVEMENT DEFLECTIONS USING DATA FROM LASER SCANNING SENSORS AS WELL AS FROM HIGH PRECISION ACCELEROMETERS AND GYROMETERS

(71) Applicant: Board of Regents, The University of Texas System, Austin, TX (US)

(72) Inventors: Jorge Prozzi, Austin, TX (US); Christian Claudel, Austin, TX (US); Praveenkumar Pasupathy, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 311 days.

(21) Appl. No.: 15/707,004

(22) Filed: Sep. 18, 2017

(65) Prior Publication Data

US 2018/0095002 A1    Apr. 5, 2018

Related U.S. Application Data

(60) Provisional application No. 62/402,732, filed on Sep. 30, 2016.

(51) Int. Cl.
*G01M 5/00* (2006.01)
*G01C 7/04* (2006.01)
(Continued)

(52) U.S. Cl.
CPC .......... *G01M 5/0058* (2013.01); *E01C 23/01* (2013.01); *G01B 11/306* (2013.01); *G01B 21/08* (2013.01);
(Continued)

(58) Field of Classification Search
CPC .... G01M 5/0058; G01M 5/0041; G01C 7/04; G01H 11/06; G08G 1/015; G01B 21/08;
(Continued)

(56) References Cited

U.S. PATENT DOCUMENTS 5,753,808 A * 5/1998 Johnson .................. E01C 23/01
                                                73/146
9,261,354 B1 * 2/2016 Mercado ................ G01B 11/24
(Continued)

OTHER PUBLICATIONS

Prozzi et al., "TxDOT Project 0-6873: True Road Surface Deflection Measuring Device," Progress Report provided to Texas Department of Transportation, May 2, 2016, pp. 1-39.
(Continued)

*Primary Examiner* — Nathaniel T Woodward
(74) *Attorney, Agent, or Firm* — Robert A. Voigt, Jr.; Winstead PC

(57) ABSTRACT

A method, system and computer program product for calculating highway and airport pavement deflections. A pavement monitoring system includes a tractor and a semi-trailer, where a rigid horizontal beam is suspended under the semi-trailer. Various sensing elements are attached to the rigid beam, such as laser scanning sensors configured to measure a distance from the laser scanning sensors to the same point on the pavement at two different times, a gyrometer configured to estimate a raw pitch rate, an inertial measurement unit configured to estimate an orientation of the beam and accelerometers configured to measure an acceleration at a same level as corresponding laser scanning sensors. By utilizing these sensing elements, a more accurate pavement deflection is estimated by not relying on indirect measurements. Furthermore, the tractor and semi-trailer of the pavement monitoring system may travel at the velocity of traffic.

20 Claims, 6 Drawing Sheets

(51) Int. Cl.
*G01H 11/06* (2006.01)
*G08G 1/015* (2006.01)
*G01B 21/08* (2006.01)
*G01B 11/30* (2006.01)
*E01C 23/01* (2006.01)
*G01B 21/20* (2006.01)
*G01B 21/32* (2006.01)

(52) U.S. Cl.
CPC ............ *G01C 7/04* (2013.01); *G01H 11/06* (2013.01); *G08G 1/015* (2013.01); *G01B 21/20* (2013.01); *G01B 21/32* (2013.01); *G01M 5/0041* (2013.01)

(58) Field of Classification Search
CPC ...... G01B 21/20; G01B 21/32; G01B 11/306; E01C 23/01
USPC .......................................................... 73/784
See application file for complete search history.

(56) References Cited

U.S. PATENT DOCUMENTS

| | | |
|---|---|---|
| 2011/0259114 A1 | 10/2011 | Ullidtz |
| 2012/0010828 A1 | 1/2012 | Ullidtz |
| 2012/0173171 A1 | 7/2012 | Bajwa et al. |
| 2013/0283924 A1 | 10/2013 | McCullough et al. |
| 2013/0321582 A1* | 12/2013 | Huang ................. G01B 11/303 348/46 |
| 2014/0207411 A1* | 7/2014 | Laurent ................. G01B 11/30 702/159 |
| 2017/0314918 A1* | 11/2017 | Shah .................... G01B 11/303 |

OTHER PUBLICATIONS

Jorge A. Prozzi, "Laser Sensor System Documentation," https://library.ctr.utexas.edu/ctr-publications/0-6873-P2.pdf, Mar. 2017, pp. 1-2.

Prozzi et al., "Concept of Operations (CONOPS)," https://library.ctr.utexas.edu/ctr-publications/0-6873-P1.pdf, Mar. 2017, pp. 1-9.

Prozzi et al., "Development of a Laser-Based Sensor to Measure True Road Surface Deflection," https://library.ctr.utexas.edu/ctr-publications/0-6873-1.pdf, Apr. 2017, pp. 1-90.

Prozzi et al., "True Road Surface Deflection Measuring Device (Phase 1)," https://library.ctr.utexas.edu/ctr-publications/psr/0-6873-s-phase1.pdf, Aug. 31, 2016, pp. 1-2.

* cited by examiner

MEASURING PAVEMENT DEFLECTIONS USING DATA FROM LASER SCANNING SENSORS AS WELL AS FROM HIGH PRECISION ACCELEROMETERS AND GYROMETERS

TECHNICAL FIELD

The present invention relates generally to the testing of pavements, and more particularly to measuring pavement deflections using data from laser scanning sensors as well as from high precision accelerometers and gyrometers.

BACKGROUND

Various systems have been developed to monitor the surface deflection of highway and airport pavements that occurs as a vehicle (e.g., truck, airplane) travels over the pavement. The surface deflection of pavements refers to the elastic deformation of the pavement. Such deformation, which may not be visible to the naked eye, may indicate early pavement damage requiring repairs. Since repairing pavement as opposed to pavement reconstruction, such as when damage becomes visible to the naked eye, is much cheaper, the deflection of pavement is measured as frequently as possible in order to repair damaged pavement before it becomes extensive requiring reconstruction.

Currently, systems used to detect pavement deflection utilize vehicles that are very slow moving, which may result in disrupting traffic, such as on a highway. Furthermore, such systems use indirect measurements which require calibration thereby providing less accurate measurements. Additionally, some systems rely upon Doppler (relative velocity) measurements, an example of an indirect measurement, making them unsuitable for measuring the deflection of certain types of pavements.

As a result, there is not currently a system that is able to accurately measure pavement deflection that utilizes a vehicle that travels at the velocity of traffic without relying on indirect measurements.

SUMMARY

In one embodiment of the present invention, a method for calculating pavement deflections comprises receiving laser distance data from laser scanning sensors involving a distance from the laser scanning sensors to a same point on a pavement at two different times. The method further comprises receiving acceleration measurements from accelerometers located at a same level from corresponding laser scanning sensors. The method additionally comprises performing, by a processor, a deconvolution of the laser distance data using the acceleration measurements. Furthermore, the method comprises determining, by the processor, a vertical position of a reference point in a beam with respect to an inertial frame as well as its pitch attitude using the deconvoluted laser distance data and a compensated raw pitch rate. Additionally, the method comprises obtaining horizontal positions of the laser scanning sensors by matching one-dimensional line scans between the laser scanning sensors. In addition, the method comprises estimating, by the processor, a pavement deflection of the pavement using a difference between the distance from the laser scanning sensors to the same point on the pavement at two different times as well as the horizontal positions of the laser scanning sensors, the vertical position of the reference point in the beam as well as its pitch attitude.

Other forms of the embodiment of the method described above are in a system and in a computer program product.

In another embodiment of the present invention, a pavement monitoring system comprises a tractor and a semi-trailer subject to a given axle load, where the semi-trailer comprises a rigid horizontal beam suspended under the semi-trailer. Furthermore, a plurality of sensing elements are connected to the beam including a plurality of laser scanning sensors configured to measure a distance, a gyrometer configured to estimate a raw pitch rate, an inertial measurement unit configured to estimate an orientation of the beam, and a plurality of accelerometers configured to measure an acceleration at a same level as corresponding laser scanning sensors.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for calculating surface pavement deflections. In one embodiment of the present invention, a pavement monitoring system includes a tractor and a semi-trailer, where a rigid horizontal beam is suspended under the semi-trailer. Various sensing elements are attached to the rigid beam, such as laser scanning sensors configured to measure a distance from the laser scanning sensors to the same point on the pavement at two different times, a gyrometer configured to estimate a raw pitch rate, which includes a rotation of the Earth measurement, an inertial measurement unit configured to estimate an orientation of the beam and accelerometers configured to measure an acceleration at a same level as corresponding laser scanning sensors. By utilizing these sensing elements, a more accurate pavement deflection is estimated by not relying on indirect measurements as discussed further below. Furthermore, the tractor-trailer of the pavement monitoring system may travel at the velocity of traffic.

The present invention is described herein with reference to certain embodiments, but it is understood that the invention can be embodied in many different forms and should not be construed as limited to the embodiments set forth herein. For example, while the following discusses the present invention in connection with utilizing a truck (tractor and semi-trailer) for measuring the surface deflection of a highway pavement, the principles of the present invention may be applied to utilizing other vehicles for measuring the deflection profile of pavement on other surfaces, such as an airport pavement. A person of ordinary skill in the art would be capable of applying the principles of the present invention to such implementations. Further, embodiments applying the principles of the present invention to such implementations would fall within the scope of the present invention.

Figure 1:
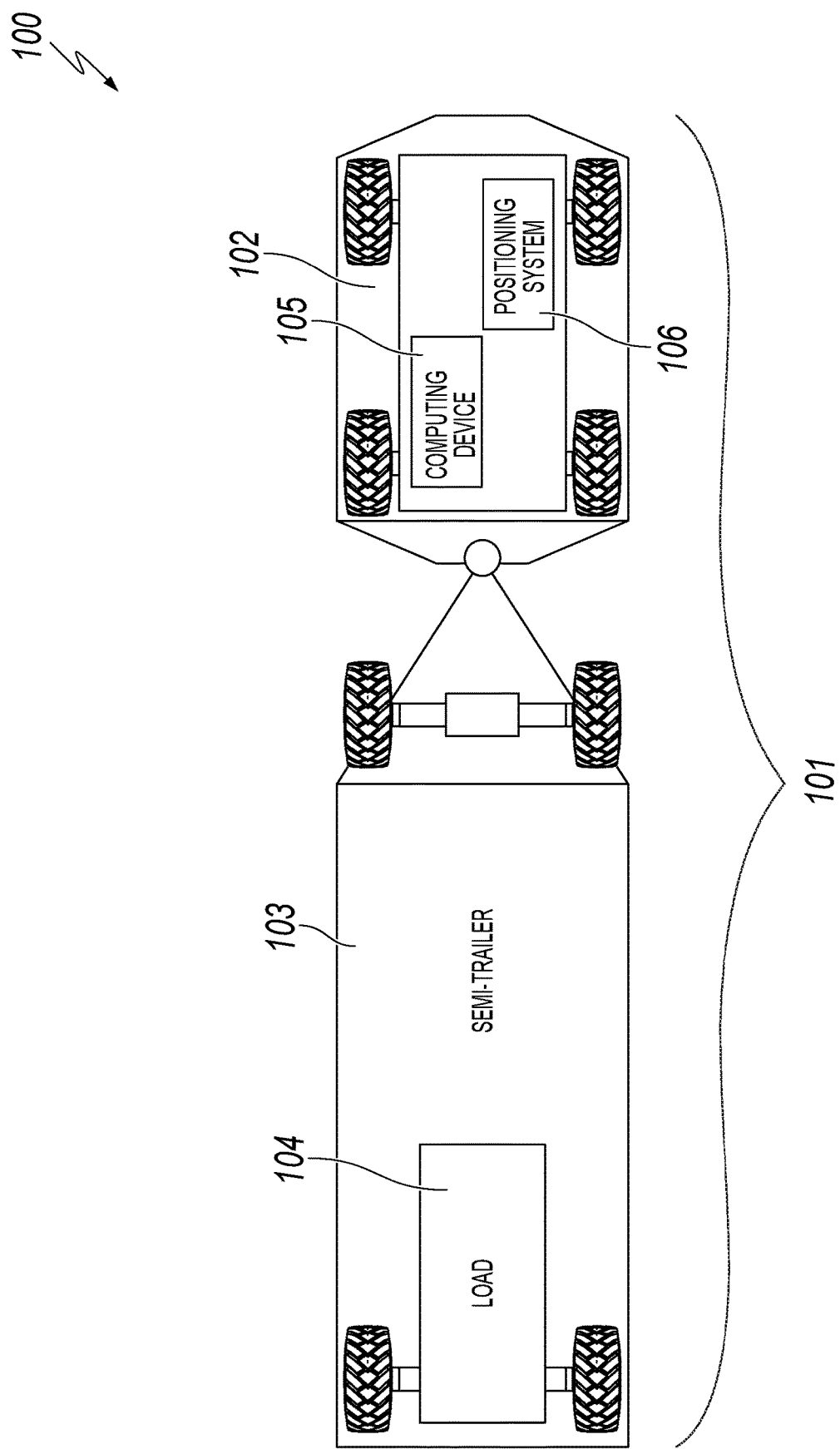
FIG. 1 illustrates a pavement monitoring system that includes a truck composed of a tractor and a semi-trailer for measuring the deflection profile of pavement subjected to the vertical loading of a fully loaded axle of a moving vehicle in accordance with an embodiment of the present invention.

Referring now to the Figures in detail, FIG. 1 illustrates a pavement monitoring system 100 that includes a truck 101 composed of a tractor 102 and a semi-trailer 103 for measuring the deflection profile of a highway or an airport pavement subjected to vertical loading (load 104) of a fully loaded axle of a moving vehicle in accordance with an embodiment of the present invention.

The deflection profile of the pavement is measured using various sensing elements (discussed further below) attached to a rigid horizontal beam suspended under semi-trailer 103 as discussed further below in connection with FIG. 2.

In connection with measuring the deflection profile of the pavement, in one embodiment, a computing device 105 may be utilized for measuring the pavement deflections, such as on the order of 10-20 micrometers. Computing device 105 may reside in various locations nearby the sensing elements, such as within tractor 102 of truck 101 as shown in FIG. 1. A description of the process for measuring the pavement deflections using direct measurements from the sensing elements is discussed further below in connection with FIGS. 2 and 4-6. A description of the hardware configuration of computing device 105 is provided below in connection with FIG. 3.

Pavement monitoring system 100 may further include a positioning system 106 (e.g., global positioning system), such as within tractor 102 of truck 101 as shown in FIG. 1. In one embodiment, positioning system 106 is configured to determine the latitude of truck 101.

Figure 2:
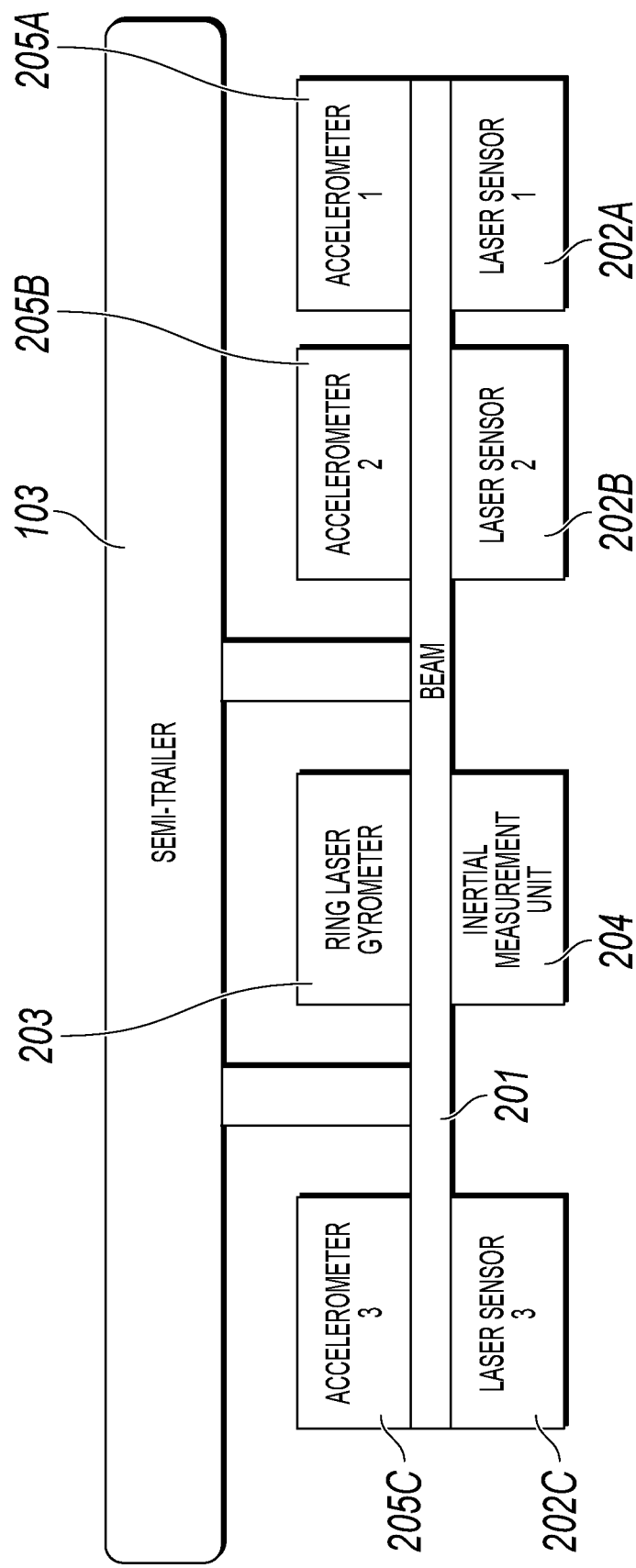
FIG. 2 illustrates the various sensing elements of the pavement monitoring system that are utilized for measuring the deflection profile of pavement subjected to the vertical loading of a fully loaded axle of a moving vehicle in accordance with an embodiment of the present invention.

Turning now to FIG. 2, FIG. 2 illustrates the various sensing elements of the pavement monitoring system 100 (FIG. 1) that are utilized for measuring the deflection profile of pavement subjected to a vertical loading of a fully loaded axle of a moving vehicle in accordance with an embodiment of the present invention.

As illustrated in FIG. 2, a rigid horizontal beam 201 (e.g., made of aluminum, steel or carbon fiber reinforced polymer (CFRP)) is suspended under semi-trailer 103. Various sensing elements are attached to beam 201, such as laser scanning sensors 202A-202C (identified as "Laser Sensor 1," "Laser Sensor 2," and "Laser Sensor 3," respectively). Laser scanning sensors 202A-202C may collectively or individually be referred to as laser scanning sensors 202 or laser scanning sensor 202, respectively. In one embodiment, laser scanning sensors 202 are 1-dimensional (line) laser distance sensors. In one embodiment, laser scanning sensors 202 are mounted perpendicularly to beam 202.

Furthermore, as shown in FIG. 2, the sensing elements further include a ring laser gyrometer 203 configured to estimate a raw pitch rate, which includes the rotation of the Earth measurement. Additionally, as shown in the FIG. 2, the sensing elements include an inertial measurement unit 204 configured to estimate the orientation of beam 201, such as with respect to a geocentric frame.

Lastly, as shown in FIG. 2, the sensing elements include accelerometers 205A-205C configured to measure the acceleration at the same level as corresponding laser scanning sensors 202A-202C, respectively. Accelerometers 205A-205C may collectively or individually be referred to as accelerometers 205 or accelerometer 205, respectively.

A description of using these sensing elements to measure a deflection profile of a pavement is provided below in connection with FIG. 4.

The pavement monitoring system 100 of the present invention is not to be limited in scope to a particular number of sensing elements as shown in FIG. 2. System 100 may include any number of laser scanning sensors 202, ring laser gyrometers 203, inertial measurement units 204 and accelerometers 205.

Figure 3:
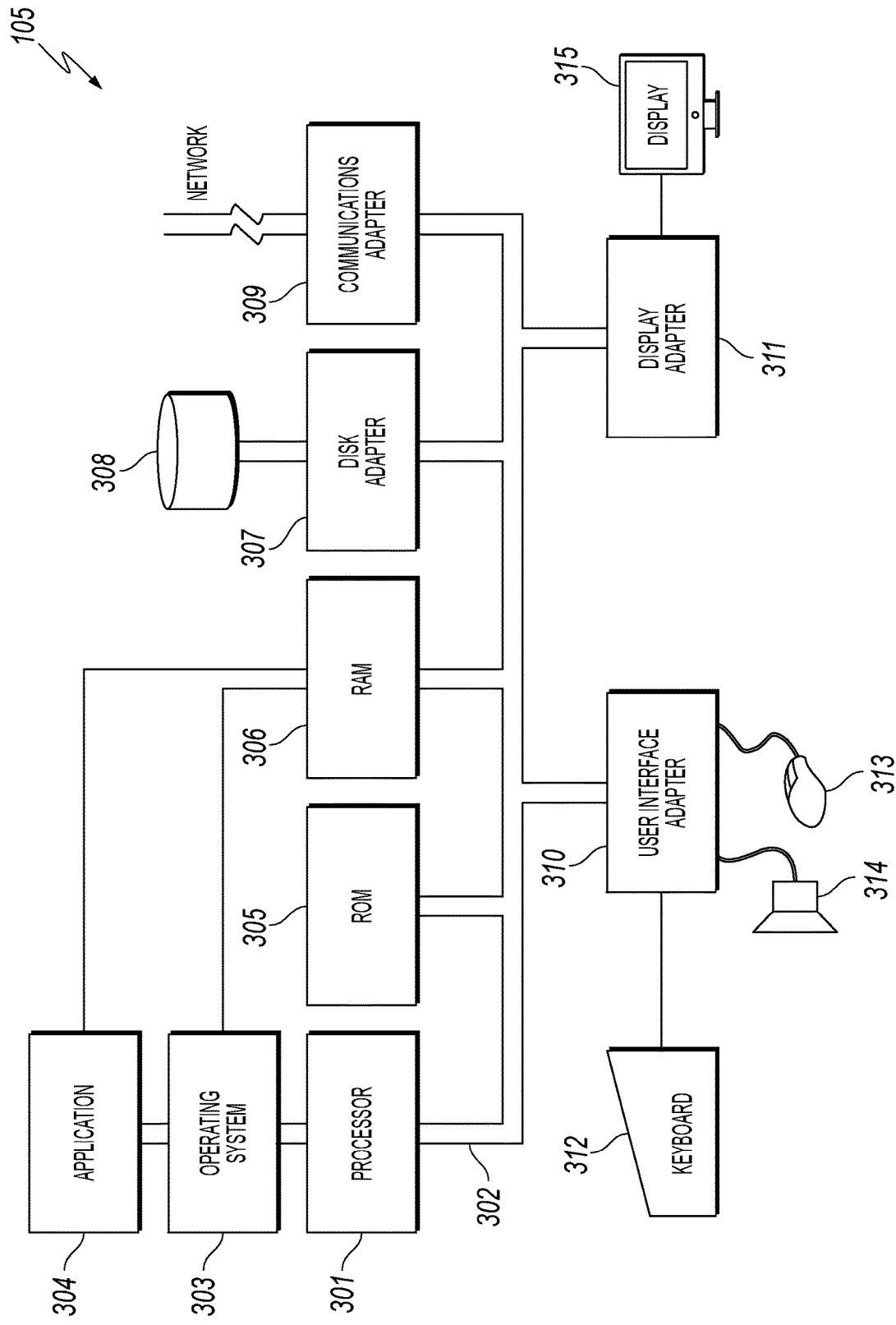
FIG. 3 illustrates an embodiment of the present invention of a hardware configuration of a computing device which is representative of a hardware environment for practicing the present invention.

Referring now to FIG. 3, FIG. 3 illustrates an embodiment of the present invention of a hardware configuration of computing device 105 (FIG. 1) which is representative of a hardware environment for practicing the present invention. As illustrated in FIG. 3, computing device 101 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for measuring pavement deflection as discussed further below in connection with FIG. 4.

Referring again to FIG. 3, read-only memory ("ROM") 305 is coupled to system bus 302 and includes a basic input/output system ("BIOS") that controls certain basic functions of computing device 105. Random access memory ("RAM") 306 and disk adapter 307 are also coupled to system bus 302. It should be noted that software components including operating system 303 and application 304 may be loaded into RAM 306, which may be computing device's 105 main memory for execution. Disk adapter 307 may be an integrated drive electronics ("IDE") adapter that communicates with a disk unit 308, e.g., disk drive.

Computing device 105 may further include a communications adapter 309 coupled to bus 302. Communications adapter 309 interconnects bus 302 with an outside network thereby enabling computing device 105 to communicate with other devices.

I/O devices may also be connected to computing device 105 via a user interface adapter 310 and a display adapter 311. Keyboard 312, mouse 313 and speaker 314 may all be interconnected to bus 302 through user interface adapter 310. A display monitor 315 may be connected to system bus 302 by display adapter 311. In this manner, a user is capable of inputting to computing device 105 through keyboard 312 or mouse 313 and receiving output from computing device 105 via display 315 or speaker 314. Other input mechanisms may be used to input data to computing device 105 that are not shown in FIG. 3, such as display 315 having touch-screen capability and keyboard 312 being a virtual keyboard. Computing device 105 of FIG. 3 is not to be limited in scope to the elements depicted in FIG. 3 and may include fewer or additional elements than depicted in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, various systems have been developed to monitor the surface deflection of highway and airport pavements that occurs as a vehicle (e.g., truck, airplane) travels over the pavement. The surface deflection of pavements refers to the elastic deformation of the pavement. Such deformation, which may not be visible to the naked eye, may indicate early pavement damage requiring repairs. Since repairing pavement as opposed to pavement reconstruction, such as when damage becomes visible to the naked eye, is much cheaper, the deflection of pavement is measured as frequently as possible in order to repair damaged pavement before it becomes extensive requiring reconstruction. Currently, systems used to detect pavement deflection utilize vehicles that are very slow moving, which may result in disrupting traffic, such as on a highway. Furthermore, such systems use indirect measurements which require calibration thereby providing less accurate measurements. Additionally, some systems rely upon Doppler (relative velocity) measurements, an example of an indirect measurement, making them unsuitable for measuring the deflection of certain types of pavements. As a result, there is not currently a system that is able to accurately measure pavement deflection that utilizes a vehicle that travels at the velocity of traffic without relying on indirect measurements.

The principles of the present invention provide a means for measuring pavement deflection accurately by using direct measurements while utilizing a vehicle that travels at the velocity of traffic as discussed below in connection with FIG. 4.

Figure 4:
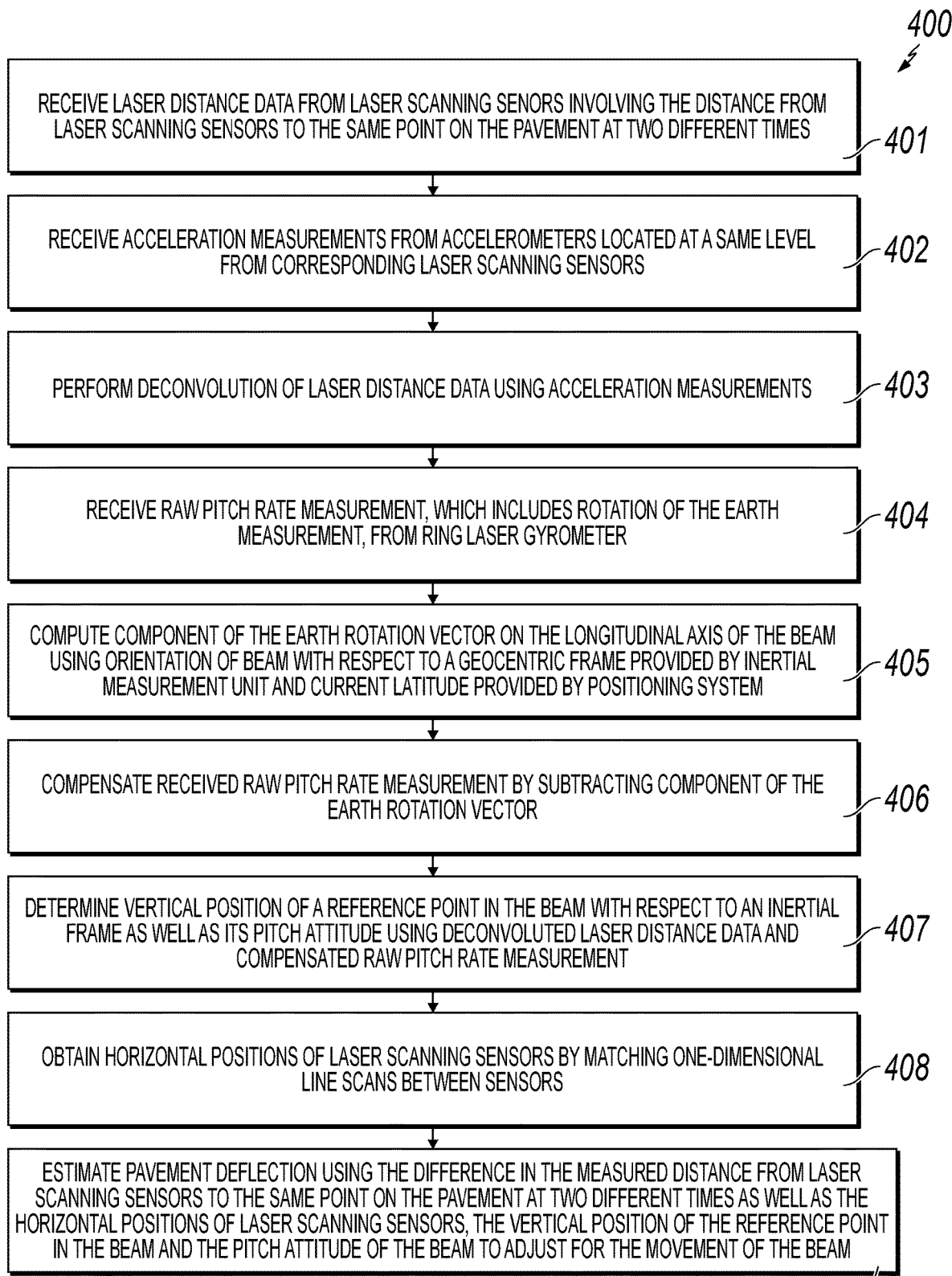
FIG. 4 is a flowchart of a method for measuring pavement deflection accurately by using direct measurements in accordance with an embodiment of the present invention.

FIG. 4 is a flowchart of a method 400 for measuring pavement deflection accurately by using direct measurements in accordance with an embodiment of the present invention.

Referring to FIG. 4, in conjunction with FIGS. 1-3, in step 401, computing device 105 receives laser distance data from laser scanning sensors 202. In one embodiment, such laser distance data involves the distance from laser scanning sensors 202 (e.g., laser sensors 202A, 202B) to the same point on the pavement at two different times as illustrated in FIG. 5.

Figure 5:
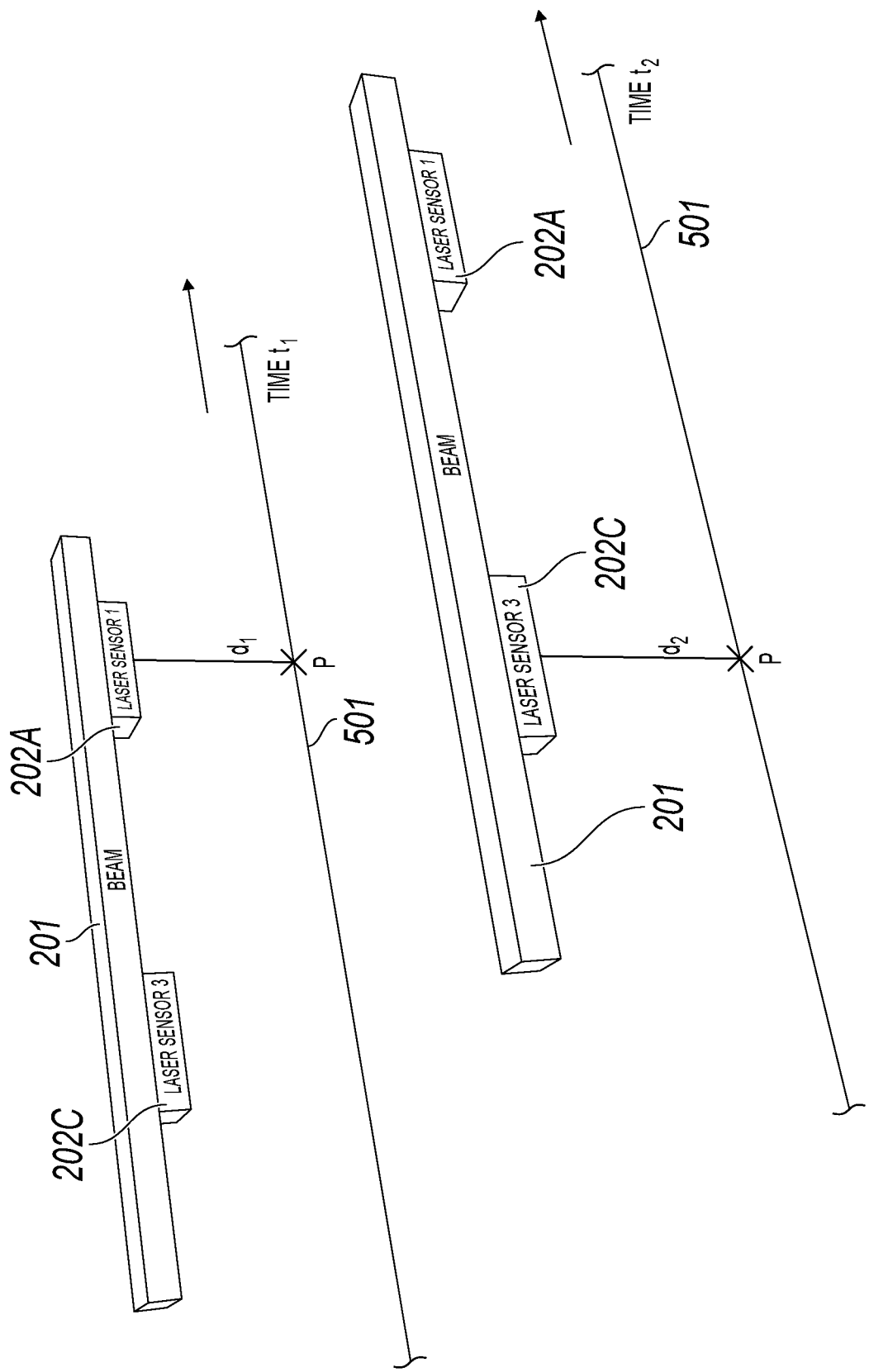
FIG. 5 illustrates measuring the deflection of pavement using the distance from a first laser sensor to a point on the pavement at time $t_1$ and the distance from a second laser sensor to the same point on the pavement at time $t_2$ in accordance with an embodiment of the present invention.

Referring to FIG. 5, FIG. 5 illustrates measuring the deflection of pavement 501 using the distance from laser sensor 202A to a point (designated as point P) on pavement 501 at time $t_1$ (designated as $d_1$) and the distance from laser sensor 202C to point P on pavement 501 at time $t_2$ (designated as $d_2$) as truck 101 is traveling to the right (as shown by the arrow pointing to the right) in accordance with an embodiment of the present invention. As will be discussed in further detail, the difference between distances $d_2$ and $d_1$ will be used in calculating the deflection of pavement 501. In one embodiment, distances $d_2$ and $d_1$ may differ due to the presence of a load, such as load 104 (FIG. 1), being placed on semi-trailer 103 (FIG. 1) above an approximate location of laser sensor 202C. For example, load 104 may be placed near the rear of semi-trailer 103 where the rear tires are located, which is also the approximate location of laser sensor 202C. As a result of load 104 being placed at the rear of semi-trailer 103, there will be a greater weight placed at point P of pavement 501 as the rear of semi-trailer 103 travels across point P.

As will be discussed further below, the pavement deflection cannot be simply measured from the difference between distances $d_2$ and $d_1$ since beam 201 is not totally stationary due to the movement of truck 101 from bumps in the road, wind, etc. As a result, such a measurement needs to be qualified using the vertical position of a reference point in beam 201, its pitch attitude and horizontal positions of laser scanning sensors 202 (e.g., laser sensors 202A, 202C) as discussed further below.

Returning to FIG. 4, in conjunction with FIGS. 1-3 and 5, in step 402, computing device 105 receives acceleration measurements from accelerometers 205 located at the same level from corresponding laser scanning sensors 202.

In step 403, computing device 105 performs deconvolution of the laser distance data using acceleration measurements in order to reverse the effects of convolution on the distance data. In one embodiment, deconvolution of the laser distance data is performed using the impulse response of laser scanning sensors 202. In another embodiment, deconvolution of the laser distance data is performed using supervised learning.

In step 404, computing device 105 receives the measured raw pitch rate, which includes the rotation of the Earth measurement, from ring laser gyrometer 203.

In step 405, computing device 105 computes the component of the Earth rotation vector on the longitudinal axis of beam 201 using the orientation of beam 201, such as with respect to a geocentric frame, provided by inertial measurement unit 204 and the current latitude of truck 101 provided by positioning system 106.

In step 406, computing device 105 compensates the raw pitch rate by subtracting the component of the Earth rotation vector thereby improving the accuracy of the measurement.

In step 407, computing device 105 determines the vertical position of a reference point in beam 201 with respect to an inertial frame as well as its pitch attitude (angle between the longitudinal axis (where beam 201 is pointed) and the horizon) using the deconvoluted laser distance data and the compensated raw pitch rate.

Figure 6:
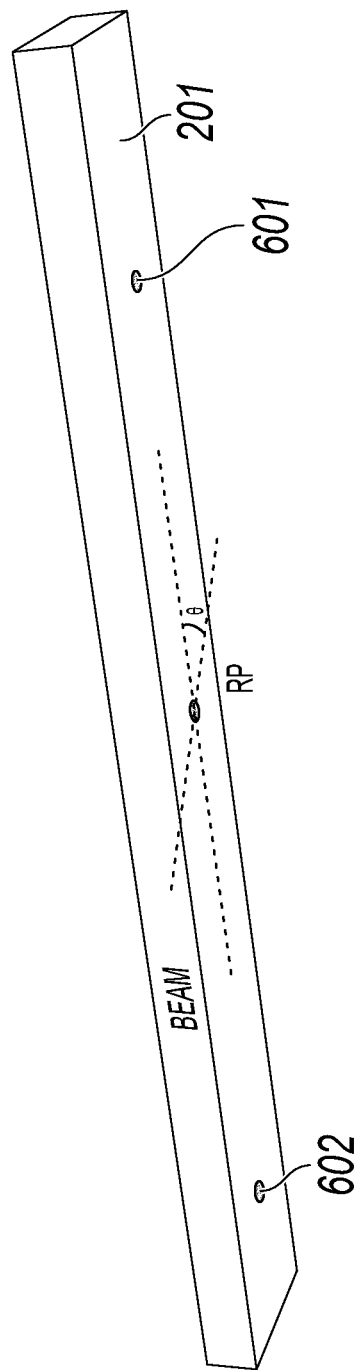
FIG. 6 illustrates the horizontal positions of the laser sensors in connection with the reference point in the beam and its pitch attitude in accordance with an embodiment of the present invention.

In step 408, computing device 105 obtains the horizontal positions of laser scanning sensors 202 by matching one-dimensional line scans between laser sensors 202 as illustrated in FIG. 6. FIG. 6 illustrates the horizontal positions of laser scanning sensors 202, such as laser sensors 202A, 202C in connection with the reference point in beam 201 and its pitch attitude in accordance with an embodiment of the present invention.

As shown in FIG. 6, the horizontal positions of laser scanning sensors 202, such as laser sensors 202A, 202C, may correspond to positions 601, 602, respectively, which are identified based on one-dimensional line scans emitted among laser scanning sensors 202. FIG. 6 illustrates that these horizontal positions of laser scanning sensors 202 may be identified with respect to the reference point in beam 201 (identified as "RP" in FIG. 6) as well as its pitch attitude (identified as θ in FIG. 6).

Returning to FIG. 4, in conjunction with FIGS. 1-3 and 5-6, in step 409, computing device 105 estimates the pavement deflection using the difference in the measured distance from laser scanning sensors 202 (e.g., laser sensors 202A, 202C) to the same point on the pavement 501 at two different times as discussed above as well as the horizontal positions of laser scanning sensors 202, the vertical position of the reference point in beam 201 with respect to an inertial frame as well as its pitch attitude to adjust for the movement of beam 201.

In one embodiment, the pavement deflection equals=($d_2$−$d_1$)−(((vertical position of reference point*pitch attitude of beam*(horizontal distance between the horizontal locations of laser sensors at time $t_1$))−(vertical position of reference point*pitch attitude of beam*(horizontal distance between the horizontal locations of laser sensors at time $t_2$))), where distances $d_2$ and $d_1$ refer to the distances discussed in connection with FIG. 5, the "vertical position of reference point" refers to the vertical position of the reference point in beam 201 discussed in connection with step 407 and shown in FIG. 6, the "pitch attitude of beam" refers to the pitch attitude of beam 201 discussed in connection with step 407 and shown in FIG. 6, and the "horizontal distance between the horizontal locations of laser sensors" refers to the difference horizontally from the horizontal locations of laser scanning sensors 202 (e.g., positions 601, 602) as shown in FIG. 6. The reference to times $t_1$ and $t_2$ refer to the times at which the distance from two different laser scanning sensors 202 to point P on pavement 501 is measured as discussed above in connection with FIG. 5.

In this manner, the maximal deflection of the pavement subject to a given load is measured with a sensing platform moving at the velocity of traffic without using indirect measurements, which requires calibration and are less accurate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for calculating pavement deflections, the method comprising:
receiving laser distance data from laser scanning sensors involving a distance from said laser scanning sensors to a same point on a pavement at two different times;
receiving acceleration measurements from accelerometers located at a same level from corresponding laser scanning sensors relative to said pavement;
performing, by a processor, a deconvolution of said laser distance data using said acceleration measurements;
determining, by said processor, a vertical position of a reference point in a beam with respect to an inertial frame as well as its pitch attitude using said deconvoluted laser distance data and a compensated raw pitch rate;
obtaining horizontal positions of said laser scanning sensors by matching one-dimensional line scans between said laser scanning sensors; and
estimating, by said processor, a pavement deflection of said pavement using a difference between said distance from said laser scanning sensors to said same point on said pavement at two different times as well as said horizontal positions of said laser scanning sensors, said vertical position of said reference point in said beam as well as its pitch attitude.

2. The method as recited in claim 1 further comprising:
receiving an uncompensated raw pitch rate;
computing a component of a Earth rotation vector on a longitudinal axis of said beam; and
compensating said raw pitch rate using said component of said Earth rotation vector on said longitudinal axis of said beam.

3. The method as recited in claim 2, wherein said component of said Earth rotation vector on said longitudinal axis of said beam is computed using an orientation of said beam with respect to a geocentric frame and a current latitude.

4. The method as recited in claim 2, wherein said uncompensated raw pitch rate is received from a pyrometer.

5. The method as recited in claim 2, wherein said orientation of said beam is provided by an inertial measurement unit and said current latitude is provided by a positioning system.

6. A computer program product for calculating pavement deflections, the computer program product comprising a computer readable storage medium having program code embodied therewith, the program code comprising the programming instructions for:
receiving laser distance data from laser scanning sensors involving a distance from said laser scanning sensors to a same point on a pavement at two different times;
receiving acceleration measurements from accelerometers located at a same level from corresponding laser scanning sensors relative to said pavement;
performing a deconvolution of said laser distance data using said acceleration measurements;
determining a vertical position of a reference point in a beam with respect to an inertial frame as well as its pitch attitude using said deconvoluted laser distance data and a compensated raw pitch rate;
obtaining horizontal positions of said laser scanning sensors by matching one-dimensional line scans between said laser scanning sensors; and
estimating a pavement deflection of said pavement using a difference between said distance from said laser scanning sensors to said same point on said pavement at two different times as well as said horizontal positions of said laser scanning sensors, said vertical position of said reference point in said beam as well as its pitch attitude.

7. The computer program product as recited in claim 6, wherein the program code further comprises the programming instructions for:
receiving an uncompensated raw pitch rate;
computing a component of a Earth rotation vector on a longitudinal axis of said beam; and
compensating said raw pitch rate using said component of said Earth rotation vector on said longitudinal axis of said beam.

8. The computer program product as recited in claim 7, wherein said component of said Earth rotation vector on said longitudinal axis of said beam is computed using an orientation of said beam with respect to a geocentric frame and a current latitude.

9. The computer program product as recited in claim 7, wherein said uncompensated raw pitch rate is received from a gyrometer.

10. The computer program product as recited in claim 7, wherein said orientation of said beam is provided by an inertial measurement unit and said current latitude is provided by a positioning system.

11. A system, comprising:
a memory unit for storing a computer program for calculating pavement deflections; and
a processor coupled to the memory unit, wherein the processor is configured to execute the program instructions of the computer program comprising:
receiving laser distance data from laser scanning sensors involving a distance from said laser scanning sensors to a same point on a pavement at two different times;
receiving acceleration measurements from accelerometers located at a same level from corresponding laser scanning sensors relative to said pavement;

performing a deconvolution of said laser distance data using said acceleration measurements;

determining a vertical position of a reference point in a beam with respect to an inertial frame as well as its pitch attitude using said deconvoluted laser distance data and a compensated raw pitch rate;

obtaining horizontal positions of said laser scanning sensors by matching one-dimensional line scans between said laser scanning sensors; and estimating a pavement deflection of said pavement using a difference between said distance from said laser scanning sensors to said same point on said pavement at two different times as well as said horizontal positions of said laser scanning sensors, said vertical position of said reference point in said beam as well as its pitch attitude.

12. The system as recited in claim 11, wherein the program instructions of the computer program further comprise:

receiving an uncompensated raw pitch rate;

computing a component of a Earth rotation vector on a longitudinal axis of said beam; and compensating said raw pitch rate using said component of said Earth rotation vector on said longitudinal axis of said beam.

13. The system as recited in claim 12, wherein said component of said Earth rotation vector on said longitudinal axis of said beam is computed using an orientation of said beam with respect to a geocentric frame and a current latitude.

14. The system as recited in claim 12, wherein said uncompensated raw pitch rate is received from a gyrometer.

15. The system as recited in claim 12, wherein said orientation of said beam is provided by an inertial measurement unit and said current latitude is provided by a positioning system.

16. A pavement monitoring system, comprising:

a tractor; and a semi-trailer subject to a given axle load, wherein said mobile trailer comprises a rigid horizontal beam suspended under said semi-trailer, wherein a plurality of sensing elements are connected to said beam comprising:

a plurality of laser scanning sensors configured to measure a distance from said plurality of laser scanning sensors to a same point on a pavement at two different times;

a gyrometer configured to estimate a raw pitch rate;

an inertial measurement unit configured to estimate an orientation of said beam; and a plurality of accelerometers configured to measure an acceleration at a same level as corresponding laser scanning sensors relative to said pavement.

17. The pavement monitoring system as recited in claim 16 further comprising:

a computing device comprising a memory unit for storing a computer program for calculating pavement deflections; and a processor coupled to the memory unit, wherein the processor is configured to execute the program instructions of the computer program comprising:

receiving laser distance data from said plurality laser scanning sensors involving said distance from said plurality of laser scanning sensors to said same point on said pavement at two different times;

receiving acceleration measurements from said plurality of accelerometers;

performing a deconvolution of said laser distance data using said acceleration measurements;

determining a vertical position of a reference point in said beam with respect to an inertial frame as well as its pitch attitude using said deconvoluted laser distance data and a compensated raw pitch rate;

obtaining horizontal positions of said plurality of laser scanning sensors by matching one-dimensional line scans between said plurality of laser scanning sensors; and estimating a pavement deflection of said pavement using a difference between said distance from said plurality of laser scanning sensors to said same point on said pavement at two different times as well as said horizontal positions of said plurality of laser scanning sensors, said vertical position of said reference point in said beam as well as its pitch attitude.

18. The pavement monitoring system as recited in claim 17, wherein the program instructions of the computer program further comprise:

receiving said raw pitch rate;

computing a component of a Earth rotation vector on a longitudinal axis of said beam; and compensating said raw pitch rate using said component of said Earth rotation vector on said longitudinal axis of said beam.

19. The pavement monitoring system as recited in claim 18, wherein said component of said Earth rotation vector on said longitudinal axis of said beam is computed using said orientation of said beam with respect to a geocentric frame and a current latitude.

20. The pavement monitoring system as recited in claim 19, wherein said current latitude is provided by a positioning system.

* * * * *